US010841291B2

(12) United States Patent
McClure

(10) Patent No.: US 10,841,291 B2
(45) Date of Patent: Nov. 17, 2020

(54) METHOD FOR BLOCK AUTHENTICATION USING EMBEDDED VIRTUAL MACHINES

(71) Applicant: VMware, Inc., Palo Alto, CA (US)

(72) Inventor: Matthew D. McClure, Alameda, CA (US)

(73) Assignee: VMware, Inc., Palo Alto, CA (US)

( * ) Notice: Subject to any disclaimer, the term of this patent is extended or adjusted under 35 U.S.C. 154(b) by 190 days.

(21) Appl. No.: 15/994,926

(22) Filed: May 31, 2018

(65) Prior Publication Data

US 2019/0372950 A1    Dec. 5, 2019

(51) Int. Cl.
*H04L 9/32* (2006.01)
*H04L 29/06* (2006.01)
*G06F 9/455* (2018.01)

(52) U.S. Cl.
CPC ............ *H04L 63/08* (2013.01); *H04L 9/3236* (2013.01); *G06F 9/45541* (2013.01); *G06F 9/45558* (2013.01)

(58) Field of Classification Search
CPC combination set(s) only.
See application file for complete search history.

(56) References Cited

U.S. PATENT DOCUMENTS

| 2011/0154318 A1* | 6/2011 | Oshins | G06F 9/45537 718/1 |
| 2014/0020086 A1* | 1/2014 | Tanikawa | G06F 21/31 726/17 |
| 2018/0219669 A1* | 8/2018 | Chen | H04L 9/002 |
| 2018/0247082 A1* | 8/2018 | Durham | G06F 8/63 |

OTHER PUBLICATIONS

Stuart Haber, et al., "How to Time-Stamp a Digital Document" https://crl.anf.es/pdf/Haber_Stornetta.pdf, Jan. 29, 2010.
Satoshi Nakamoto, "Bitcoin: A Peer-to-Peer Electronic Cash System" http://bitcoin.org/bitcoin.pdf, Jan. 29, 2020.
John R. Douceur, "The Sybil Attack" https://www.freehaven.net/anonbib/cache/sybil.pdf, Jan. 29, 2010.
Moritz Lipp, et al. "Meltdown" https://meltdownattack.com/meltdown.pdf, Jan. 29, 2020.
Paul Kocher, et al., "Spectre Attacks: Exploiting Speculative Execution" https://spectreattack.com/spectre.pdf, Jan. 29, 2010.

* cited by examiner

*Primary Examiner* — Josnel Jeudy
(74) *Attorney, Agent, or Firm* — Patterson + Sheridan, LLP

(57) ABSTRACT

The disclosure provides an approach for authenticating a block of storage by embedding a virtual machine and an authentication algorithm into the block. The virtual machine contains the authentication algorithm. The algorithm remains opaque in its operation by hiding its execution within the embedded VM. The non-transparent operation of the algorithm prevents a malicious entity from learning how to modify information in the block and from learning to how to evade detection of that modification by the authentication algorithm. The opaqueness of the algorithm adds security to a computer storage system.

20 Claims, 3 Drawing Sheets

METHOD FOR BLOCK AUTHENTICATION USING EMBEDDED VIRTUAL MACHINES

BACKGROUND

Blocks of storage are often authenticated using hash functions. For example, a block of storage may store a hash value of the data in the block. Performing a hash of the data in the block and comparing the resulting hash value to the hash value stored in the block can serve to authenticate the data in that block. If the resulting hash value and the hash value stored in the block are equal, then the data stored in the block is authenticated as not having been modified since the creation of the hash value stored in the block.

The hash functions used to obtain hash values of data are often publicly known and transparent functions. Standard hash functions usually take as input an arbitrarily large amount of data, and return a hash value of a fixed size, such as for example, a 256-bit hash value. Two different inputs to a hash function may result in the same hash value being returned by the hash function. When two different inputs to a hash function result in the same output, a "collision" occurs.

Predicting what input causes a collision with another input is almost impossible, because the process involves sequentially inputting arbitrary data into the hash function and then comparing the results. Given the large number of possible outputs of a standard hash function, such a process can take a long time.

However, as computing power increases, such a comparison process may become feasible. Increased computing power may jeopardize authentication techniques based on standard, transparent, and publicly known hash functions. Increased computing power may also jeopardize authentication techniques based on hash functions whose logic can be learned through observation. For example, a malicious entity may modify data within a storage block, and then add an arbitrary piece of data that, when the data on the block is hashed, would result in a hash value as that stored on the block. Thus, standard and observable hash functions may pose a security risk as computing power increases.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides techniques for authenticating a block of storage by embedding a virtual machine (VM) and an authentication algorithm into the block. The virtual machine contains the authentication algorithm. The algorithm remains opaque in its operation in that the logic of the algorithm is hidden from observation within execution of the embedded VM. Because the operation of the algorithm is non-transparent, the algorithm cannot be learned, which prevents a malicious entity from taking advantage of the algorithm. The algorithm remains known only to authorized users. Modifying information in the block by a malicious entity in a way that is not noticeable by the authentication algorithm becomes difficult, which adds security to a computer storage system. The techniques provide a technical solution to the technical problem of authenticating data that may have been tampered with by a malicious entity. The techniques comprise unconventional steps, such as the instantiation of a virtual machine embedded within the storage block being authenticated, so as to improve security of the authentication process.

Figure 1A:
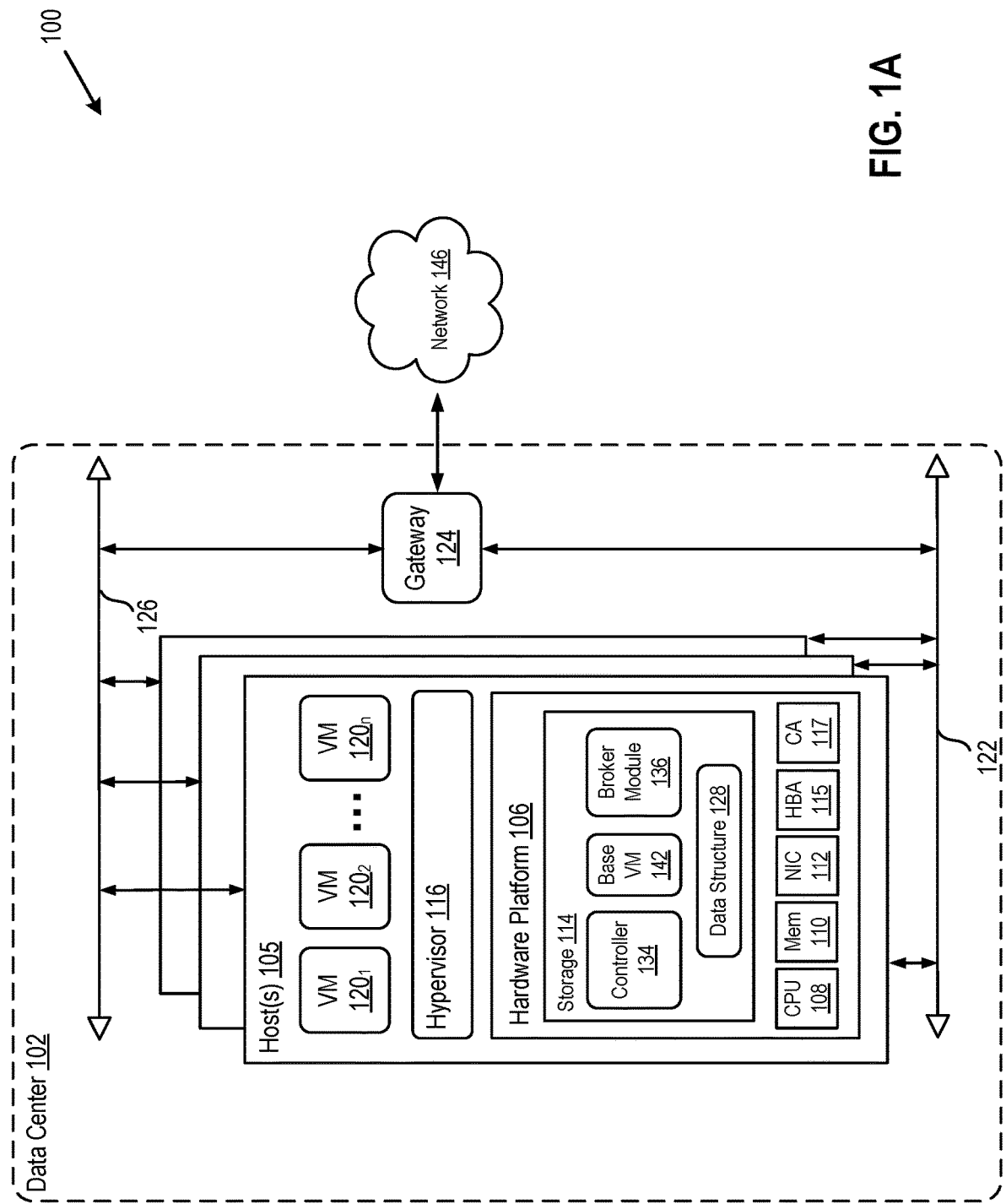
FIG. 1A depicts a block diagram of a computer system in which one or more embodiments of the present disclosure may be utilized.

FIG. 1A depicts a block diagram of a computer system 100 in which one or more embodiments of the present disclosure may be utilized. Data center 102 may be an on-premise data center or a cloud data center. Data center 102 includes host(s) 105, a gateway 124, a management network 126, and a data network 122. Although the management and data network are shown as separate physical networks, it is also possible in some implementations to logically isolate the management network from the data network using different virtual local area network (VLAN) identifiers. Each of hosts 105 may be constructed on a server grade hardware platform 106, such as an x86 architecture platform. For example, hosts 105 may be geographically co-located servers on the same rack or on different racks in any arbitrary location in datacenter 102.

Host 105 is configured to provide a virtualization layer, also referred to as a hypervisor 116, that abstracts processor, memory, storage, and networking resources of hardware platform 106 into multiple virtual machines $120_1$ to $120_n$ (collectively referred to as VMs 120 and individually referred to as VM 120). VMs on the same host 105 may run concurrently. Although the disclosure teaches techniques with reference to VMs, the techniques may also be performed by using other virtual computing instances (VCIs), such as containers, Docker containers (see, e.g., www.docker.com), data compute nodes, isolated user space instances, namespace containers, and the like.

Hypervisor 116 architecture may vary. In some embodiments, a virtualization software can be installed as system level software directly on the server hardware (often referred to as "bare metal" installation) and be conceptually interposed between the physical hardware and the guest operating systems (OSs) executing in the virtual machines. Alternatively, the virtualization software may conceptually run "on top of" a conventional host operating system in the server. In some implementations, hypervisor 116 may comprise system level software as well as a "Domain 0" or "Root Partition" virtual machine, which is a privileged machine that has access to the physical hardware resources of the host. In this implementation, a virtual switch, virtual tunnel endpoint (VTEP), etc., along with hardware drivers, may reside in the privileged virtual machine. One example of hypervisor 116 that may be used is a VMware ESXi™ hypervisor provided as part of the VMware vSphere® solution made commercially available from VMware, Inc. of Palo Alto, Calif.

Hardware platform 106 of each host 105 may include components of a computing device such as one or more processors (CPUs) 108, system memory 110, a network interface 112, a storage system 114, a host bus adapter (HBA) 115, a compute accelerator (CA) 117, and other I/O devices such as, for example, a mouse and keyboard (not shown).

CPU 108 is configured to execute instructions, for example, executable instructions that perform one or more operations described herein and that may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Host bus adapter (HBA) couples host 105 to one or more external storages (not shown), such as a storage area network (SAN) or distributed virtual SAN. Other external storages that may be used include network-attached storage (NAS) and other network data storage systems, which may be accessible via NIC 112.

CA 117 is a specialized type of processor that performs certain mathematical calculations faster than CPU 108. For example, a graphics processing unit (GPU) is a CA specially designed to rapidly manipulate and alter memory for the creation of images. Other examples of CAs include specialized silicon, digital signal processors (DSPs), and field-programmable gate array (FPGAs). CA 117 may be located within host 105 or may be peripheral to host 105. CAs typically function in groups or farms in which many CAs work together to execute a kernel so as to perform a CA workload for that kernel. As such, CA 117 may be a plurality of CAs working together. In the context of CAs, a "kernel" or "compute kernel" is a small piece of code with one or more loops, and the loop(s) is executed many times by a CA or group of CAs to perform a CA workload. For additional details on CAs, CA workloads, and kernels see application Ser. No. 15/990,537, filed May 25, 2018, the entire contents of which are incorporated by reference herein.

Storage system 114 represents persistent storage device(s). Storage 114 includes a controller 134, broker module 136, base VM code 142, a data structure 128, and storage disks (not shown). Storage disks of storage 114 may be one or more hard disks, flash memory modules, solid state disks, and/or optical disks. Data on storage disks of storage 114 may be organized into blocks, such as through a content-addressable storage (CAS) system, and each block on storage system 114 may be addressable. Data within storage 114 may also be organized within data structure 128, which itself may include blocks of data. Data structure 128 may be one of well-known storage data structures, such as an array, a linked list, a stack, a queue, a blockchain, or the like. It should be noted that data structure 128 is optional, in that method 200 may be performed without data structure 128. Although storage 114 is shown as being local to host 105, storage 114 may be external to host 105, such as by connection via HBA 115.

Figure 1B:
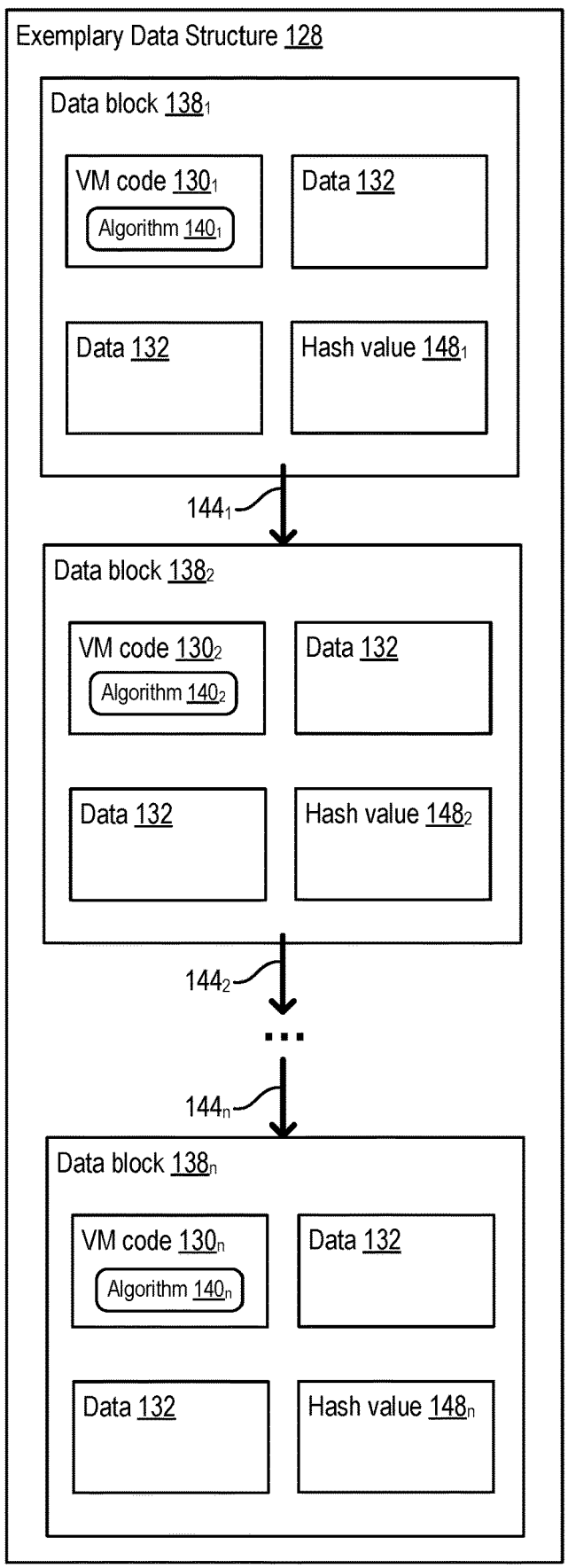
FIG. 1B depicts a block diagram showing organization of an exemplary storage data structure, according to an embodiment.

FIG. 1B depicts a block diagram showing organization of an exemplary storage data structure 128, according to an embodiment. Although data structure 128 may be any of the well-known data structures listed above, FIG. 1B depicts exemplary data structure 128 as a blockchain. Data in data structure 128 may be organized into a plurality of data blocks $138_1$ to $138_n$ (collectively referred to as blocks 138 and individually referred to as block 138). The size of block 138 may be, for example, 4 KB, 100 KB, 1 MB, 2 MB, LOMB, or 50 MB. Each block 138 may contain data 132, VM code 130, hash value 148, and pointer 144. Data 132 is any data other than VM code 130, hash value 148, and pointer 144. Each block 138 may be an object, such as a container object, and/or may be a division of storage 114 and/or data structure 128.

Data structure 128 may be a distributed data structure in that a copy of data structure 128 may exist on several hosts 105, connected by a network such as network 146, 126, or 122. Hosts 105 containing a copy of data structure 128 may implement a synchronization mechanism to sync copies of data structure 128. The synchronization mechanism may be, for example, a proof-of-work consensus algorithm, a proof-of-stake consensus algorithm, or another mechanism. Other synchronizations mechanisms include an exclusive lock of a shared storage resource for update and retrieval of data structure 128 or client/server cache coherency using versioning, such as for example, Web Distributed Authoring and Versioning (WebDAV) defined by the Internet Engineering Task Force (IETF) Request for Comment (RFC) 6578 document, published March 2012.

Pointer 144 is an optional component to data structure 128, and is specific to data structures that have a linear and non-contiguous arrangement of blocks 138 within storage 114. For example, blockchains and linked lists have pointer 144 in each block 138 pointing to the location in storage 144 or memory 110 of the next block 138, and the terminal block contains pointer 144 that has a NULL value. Using FIG. 1B to illustrate the example, pointer 144, points to the location in storage 114 of block $138_2$, which contains pointer $144_2$ that points to the location in storage of block $138_3$. Block $138_n$ contains a NULL pointer $148_n$.

Hash value 148 is a value that provides a layer of security or authenticity to verification of data block 138 and to verification of data structure 128. Hash value 148 is the output of a hash function. The hash function may be a standard hash function, such as Secure Hash Algorithm (SHA)-256. Hash value 148 is the output resulting from inputting data into that hash function, the input data being within block 138 that contains hash value 148, and optionally, the input data includes hash value 148 of previous block 138. In an embodiment in which data structure 128 is distributed and many entities or hosts 105 may be adding information to data structure 128, the input data may include the public key or public signature of the entity or host 105 that added block 138 to data structure 128. The public key or public signature may be associated with controller 134 or broker module 136 of the entity or host 105 that added block 138 to data structure 128, or that modified block 138 within data structure 128. In an embodiment, hash value 148 may be the result of a series of sub-hashes. For example, hash value 148 may be the Merkle root of a Merkle tree, wherein the leaves of the Merkle tree are subdivisions of data 132.

When block 138 is created or modified within data structure 128, data (e.g., all data) within block 138 (e.g., including VM code 130 and data 132) is inputted into a hash function, and the output is stored within data block 138 as hash value 148. In a blockchain structure, the hash value of the previous data block 138 is also included in the input to the hash algorithm, resulting in a verifiable linear structure of the blockchain. The verifiable linear structure results because, for example, hash value $148_3$ of block $138_3$ includes hash value $148_2$ of previous block $138_2$, and so on—the first block 138 of a blockchain, such as block $138_1$, would not include a hash value 148 of the previous block 138.

The connections between hash values 148 in a blockchain structure means that modifying block 138 invalidates hash value 148 of the modified block 138 and invalidates hash value 148 of block 138 that follows the modified block 138. Invalid hash values 148 result in an overall structure of data structure 128 that cannot be authenticated, unless hash values 148 of the modified block 138 and all subsequent blocks 138 are recalculated and re-stored into respective blocks 138.

Data block 138 of data structure 128 can be authenticated by re-executing the same hash function used to calculate hash value 148, using the same input variables as in the original calculation, and then comparing the stored hash value 148 to the resulting output of the hash function. The overall structure of data structure 128 can be authenticated by authenticating each block 138, which can be done by comparing stored hash value 148 of each block to output of the hash function that was originally used to calculate has value 148. The comparison process may be called "verifying" or "authenticating" the stored hash value 148. If all hash values 148 of all data blocks 138 match output of the hash function, then data structure 128 may be authenticated as not having been modified since the last authorized calculation and storage of hash values 148 within data structure 128. Hash value 148 may also serve as a layer of authentication of block 138, in addition to the layer of authentication provided by algorithm 140, as discussed below.

In other words, in an embodiment, hash value 148 is obtained by hashing at least hash value 148 of the previous block 138. Because hash value 148 of the previous block 138 is used to obtain hash value 148 of the subsequent block 138, a "link" is established between the two blocks within hash value 148 of the second (subsequent) of the two blocks. The second of the two blocks is the block being authenticated when verifying its hash value 148. To verify that hash value 148 is correct, hash value 148 of the previous block is needed. Verifying a hash value 148 of block 138 being authenticated, in effect, authenticates a link between the block 138 being authenticated and its previous block.

Authenticating each link within data structure 128, by verifying each hash value 148 of data structure 128, authenticates the structure of data structure 128. In some implementations, the structure of data structure 128 may be sufficiently authenticated by verifying only some hash values 148 of data structure 128, such as for example, the most recent five, ten, twenty, or one-hundred hash values 148, or by verifying the most recent, 5%, 10%, 20%, or 50% of hash values 148 of data structure 128.

VM code 130 is code that, when instantiated, alone or in conjunction with base VM code 142, becomes a running VM, such as one of VMs 120 of FIG. 1A. VM code 130 adds another layer of authentication security to blocks 138 and data structure 128, in addition to the layer of authentication security created by hash values 148. VM code 130 may be partial code for VM 120, such that when VM code 130 is combined with base VM code 142, then the combined VM code may be instantiated on host 105 to result in a running VM 120. VM code 130 may be merely an instruction to instantiate base VM code 142, or a pointer to base VM code 142. Base VM code 142 may be an operational VM or partial code for an operational VM, and VM code 130 may be an update or upgrade to base VM code 142. VM code 130 may be a "seed" or input to algorithm 140 in embodiments in which algorithm 140 is contained wholly within base VM code 142. Although VM code 130 is described in reference to a virtual machine, VM code may comprise code for any type of VCI. For example, VM code 130 may comprise code for a container layer, which when combined base VM code 142 (e.g., base code for a container), may be executable as a functional container object. A VM or VCI instantiated at least in part by VM code 130, as described above, is herein referred to as an "embedded VM" 120. VM code 130 may be necessary for running embedded VM 120 while embedded VM 120 is running.

Although base VM code 142 is shown in FIG. 1A as located on storage 114, base VM code 142 may located anywhere that is accessible to host 105 on which an embedded VM 120 is instantiated. For example, base VM code 142 may be located in memory 110, local memory of CA 117, on a separate host 105 of data center 102, or on a host of a remote data center across network 146.

VM code 130 may contain algorithm 140. Algorithm 140 may be a complete algorithm, or algorithm 140 may be a partial algorithm, with the rest of the algorithm present on base VM code 142. Algorithm 140 may also be wholly present within base VM code 142, with none of the code for algorithm 140 being present within VM code 130 of data block 138. Algorithm 140 may take as an input various data, or algorithm 140 may run without an input.

When algorithm 140 is executed, such as by embedded VM 120, algorithm 140 analyzes block 138 containing algorithm 140, and algorithm 140 returns a response indicating whether analyzed block 138 is authentic or inauthentic. In the embodiment in which algorithm 140 is contained wholly within base VM code 142, algorithm 140 analyzes any given block 138 of which authentication is requested, and not necessarily of block 138 that contains code of algorithm 140. The authentication response of algorithm 140 serves as a layer of authentication security in addition to the layer provided by hash values 148.

The layer of authentication security provided by algorithm 140 results from algorithm 140 being an opaque and dynamic algorithm. Algorithm 140 is opaque in that the logic of the algorithm is masked within the execution of VM 120. Algorithm 140 is dynamic in that it is upgradeable and modifiable, as discussed below. The opaqueness of algorithm 140 is accomplished by revealing minimal information about the operation of algorithm 140 during execution within embedded VM 120. Ideally, when embedded VM 120 is instantiated, it returns minimal information to indicate whether a given block 138 is authentic or inauthentic. For example, algorithm 140 may return the value "1" to indicate authenticity, or the value "0" to indicate inauthenticity. Algorithm 140 may simply turn on current in a particular wire to indicate authenticity, and not turn on a current in a particular wire to indicate inauthenticity.

VM code 130 and base VM code 142 are particular to VMs and VCIs, such that when combined by varying operating systems or hypervisors on different hosts, the instantiated combination of VM code 130 and base VM code 142 result in a running VM, or in a running VCI generally. Essentially, in an embodiment, complete code for a running VM 120 may be split into two or more parts, with one part being VM code 130, another part being base VM code 142, and other parts being located elsewhere, as needed. Algorithm 140 may also be split into two or more parts also, such that part of algorithm 140 or the code for algorithm 140 is contained within VM code 130, and part of algorithm 140 or code for algorithm 140 is contained within base VM code 142. In an embodiment, neither base VM code 142 nor VM code 130 comprise code for an OS or for general software modules that merely support the instantiation of a VM or a VCI. Similarly, in an embodiment, algorithm 140 does not comprise code for an OS or for general software modules that merely support the instantiation of a VM or a VCI.

The present disclosure provides for a method of instantiating a VCI 120, the VCI 120 containing an algorithm 140, wherein the code for the VCI 120 comprises a first part of the VCI and a second part of the VCI, and wherein the code for the algorithm comprises a first part of the algorithm and a second part of the algorithm, the first part of the VCI comprising the first part of the algorithm, the second part of the VCI comprising the second part of the algorithm, the first part of the VCI being stored separately and/or remotely from the second part of the VCI, wherein instantiating the VCI 120 comprises combining the first part of the VCI and the second part of the VCI, and wherein executing the algorithm 140 comprises combining the first part of the algorithm and the second part of the algorithm, and further wherein executing the algorithm 140 may comprise combining the first part of the VCI and the second part of the VCI.

Algorithm 140 may be one of standard hash functions, such as a message digest algorithm (e.g., MD6), a SHA algorithm, a checksum, Snefru, etc., or algorithm 140 may be a custom hash function. Security is obtained at least partly from the lack observability of the operation of algorithm 140. The lack of observability means that a malicious entity would not learn which of publicly known hash functions are used by algorithm 140, and therefore, would not know how to modify data in block 138 without invalidating authenticity of data structure 128. Invalidating authenticity of data structure 128 would raise attention to the unauthorized modification, allowing effects of the modification or the modification itself to be precluded.

Algorithm 140 may be made more secure if algorithm 140 may only run on a trusted host 105, or if algorithm 140 may only return an AUTHENTIC response if ran on the trusted host 105. For example, algorithm 140 may include code to check the media access control (MAC) address of host 105 that is hosting embedded VM 120, on which algorithm 140 is executing. Algorithm 140 may be implemented such that algorithm 140 returns an AUTHENTIC result only if the MAC address of host 105 is one of accepted MAC addresses. For another example, algorithm 140 may include code to check for the presence of a binary file on host 105 that is hosting embedded VM 120 on which algorithm 140 is executing. Algorithm 140 may be implemented such that algorithm 140 returns an AUTHENTIC result only if the file is present. The trusted host 105 may be host 105 running broker module 136.

Such necessary conditions for an AUTHENTIC result would be opaque to a malicious entity observing behavior of algorithm 140. Each algorithm 140 in each block 138 of data structure 128 may be unique, resulting in a unique algorithm 140 for every block 138, and further preventing a malicious entity from learning the operation of algorithm 140 through observation.

Algorithm 140 may be in the form of a kernel, to be executed on CA 117. Data 132 on the same block 138 as VM code 130, or other data, may serve as a working set for the kernel. An advantage of running algorithm 140 on CA 117 is that CA 117 is peripheral to CPU 108, and the execution flow of CA 117 will not interfere with the execution of processes on CPU 108. For example, if algorithm 140 contained an infinite loop, the infinite loop running on CA 117 would not inhibit normal operation of CPU 108, and thus would not inhibit operations of other applications or VMs 120 running on host 105. Another advantage of running algorithm 140 on CA 117 is that CA 117 may be specialized for executing the mathematical functions of algorithm 140, and thus may complete execution of algorithm 140 faster than CPU 108, improving latency of data storage operations. An additional advantage is that CA 117 is a specialized processor, so CA 117 may have a reduced instruction set compared to CPU 108. A reduced instruction set reduces the attack surface of a processor, making CA 117 more secure and more able to withstand malicious attacks, as compared to CPU 108. For details on one embodiment of executing a kernel and working set on CA 117, see application Ser. No. 15/990,537, incorporated by reference above.

It would be apparent to a person of ordinary skill in the art that components of exemplary data structure 128 shown in FIG. 1B may be organized into data structures 128 other than a blockchain, or may be organized within storage 114 without a need for data structure 128. For example, components of FIG. 1B may be organized into a two-dimensional array data structure, such that each block 138 is a row, and VM code 130, data 132, and hash value 148 each constitute a column entry within that row. A pointer 144 would not be necessary for a two-dimensional array data structure. For another example, a data structure 128 is not needed if blocks 138 are organized within storage 114 into a block-level storage system, such as a SAN of flash-based storage distributed across one or more hosts 105. Each block of such a block-level storage system may contain components VM code 130, data 132, and hash value 148.

Returning to FIG. 1A, controller 134 is the managing module for storage 114. Controller 134 is aware of the topology of disks 128 and may handle operations on data 132 of storage 114. Controller 134 may be the managing module of data structure 128, and may be responsible for adding information to blocks 138, and for adding, removing, or modifying blocks 138 on data structure 128. Controller 134 may be responsible for providing block 138 or data structure 128 to broker module 136 for authentication. Controller 134 may be responsible for executing an upgrade process of algorithm 140, as described below. Although controller 134 is shown as present on storage 114, controller 134 may be external to storage 114, and may be, for example, a driver for storage 114 installed on host 105.

Broker module 136 is responsible for authenticating block 138 and/or data structure 128. Although broker module 136 is shown as present on the same host as controller 134, broker module 136 may be located on a separate host 105, such as in a data center remote from data center 102. Broker module 136 may have a copy of data structure 128, which may be synchronized with other copies of data structure 128 present on remote hosts 105 that are remote to host 105 containing broker module 136. Alternatively, broker module 136 may receive from remote host 105 a copy of data structure 128 or a copy of block 138 each time an authentication of block 138 is requested.

Upon receiving a request to authenticate block 138, broker module 136 uses VM code 130, of block 138 that is to be authenticated, to instantiate an embedded VM 120. Broker module 136 executes algorithm 140, and communicates a response, such as to controller 134 or to another requesting module, as to whether a particular block 138 is authentic or inauthentic. Prior to instantiating embedded VM 120, broker module 136 may first authenticate the structure of data structure 128 by executing, for each block 138 in data structure 128, a standard hash function and comparing the result of the hash function to hash value 148 of the block to be authenticated, as described with reference to FIG. 2 below.

Broker module 136 has access to base VM code 142 and to CA 117. Broker module 136 may be located on the same host 105 as base VM code 142 and CA 117, or broker module 136 may be located remotely to base VM code 142 and/or CA 117. Broker module 136 may execute algorithm 140 on CPU 108 or on CA 117. Broker module 136 may contain or have access to a file (not shown) required for algorithm 140 to return an AUTHENTIC response when authenticating block 138. In an embodiment, broker module 136 may perform the functions of controller 134.

Gateway 124 provides VMs 120 and other components in data center 102 with connectivity to network 146. Network 146 may be, for example, a direct link, a local area network (LAN), a wide area network (WAN) such as the Internet, a peer-to-peer network, another type of network, or a combination of these. Gateway 124 may manage external public IP addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

Figure 2:
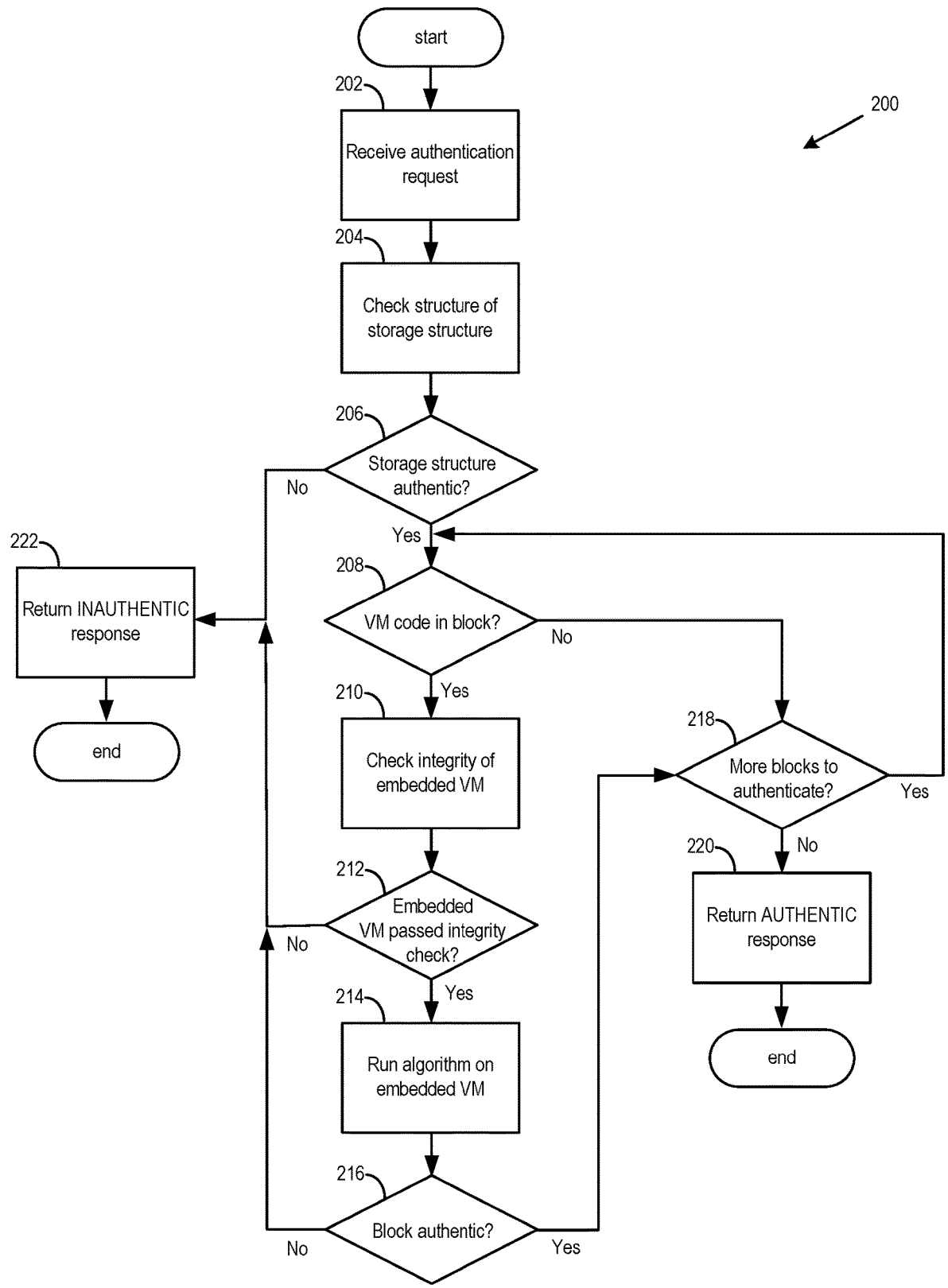
FIG. 2 depicts a flow diagram of a method of authenticating one or more storage blocks, according to an embodiment.

FIG. 2 depicts a flow diagram of a method 200 of authenticating one or more storage blocks 138, according to an embodiment. Method 200 may be performed by broker module 136. At step 202, broker module 136 receives a request to authenticate block 138 and/or data structure 128. The request may contain an identifier for block 138 that is to be authenticated. The request may be sent by any software module that is accessing data 132 of data structure 128. The requesting software module may be located on the same host 105 as broker module 136, or on a remote host 105, such as a remote host 105 that is within or external to data center 102.

The request may be received by broker module 136 along with a copy of data structure 128, or along with a copy of block 138 to be authenticated without the rest of data structure 128. Alternatively, broker module 136 may have access to its own copy of block 138 and/or data structure 128, in which case only a request may be received at step 202. The copy of block 138 and/or data structure 128 accessible to broker module 136 may be local to broker module 136, such as located on the same host 105 as broker module 136. It should be noted that if only block 138 is to be authenticated and not data structure 128 as a whole, then steps 204 and 206 of method 200 may be skipped and method 200 may proceed from step 202 to step 208.

At step 204, broker module 136 authenticates the structure of data structure 128. This may be done, for example, by computing a hash value of each block 138 in data structure 128 and comparing the computed hash value to the stored hash value 148 within each block 138. If any computed hash values do not match stored hash values 148, then the overall structure of data structure 128 may have been tampered with or have been corrupted. This would mean that data structure 128 cannot be authenticated.

At step 206, broker module 136 determines whether structure of data structure 128 is authentic. If broker module 136 cannot authenticate data structure 128, then method 200 proceeds to step 222 and returns an INAUTHENTIC response to the requesting software module. After step 222, method 200 ends. If broker module 136 authenticates structure of data structure 128, then method 200 proceeds to step 208 for further authentication of individual block(s) 138.

At step 208, broker module 136 determines whether VM code 130 is present in block 138 that is to be authenticated. If VM code 130 is determined to not be present in block 138, then the authentication of this particular block may be over, and method 200 proceeds to step 218. If VM code 130 is not present, then block 138 may still undergo a layer of authentication in step 204, such as through calculating hash value 148 of the block to be authenticated, or in other steps not shown in FIG. 2. If VM code 130 is present in block 138 that is to be authenticated, then method 200 proceeds to step 210.

At step 210, broker module 136 checks the integrity of embedded VM 120 associated with VM code 130. The integrity check may include scanning code required to instantiate embedded VM 120 for signs of code corruption. The integrity check may include attempting to power on embedded VM 120, and if VM 120 does not power on, then the integrity check fails.

At step 212, broker module 136 determines if all tests required for integrity check of embedded VM 120 pass. If so, then method 200 proceeds to step 214. If not, then method 200 proceeds to step 222.

At step 214, broker module 136 runs algorithm 140 that is present within embedded VM 120 associated with VM code 130 of the block to be authenticated. If embedded VM 120 had not been powered on as part of the integrity check of step 210, then embedded VM 120 is powered on using at least VM code 130 as part of step 214. Algorithm 140 may be executed by an embedded VM 120 on CPU 108. Or, algorithm 140 may be a compute kernel executed on CA 117. As part of step 214, algorithm 140 returns an AUTHENTIC or INAUTHENTIC response.

At step 216, broker module 136 receives the AUTHENTIC or INAUTHENTIC response from algorithm 140. If block 138 is determined to be inauthentic, then method 200 proceeds to step 222. As part of step 222, broker module 136 may suspend or shut down the embedded VM 120. If block 138 is determined to be authentic, then method 200 proceeds to step 218.

At step 218, broker module 136 determines whether more blocks 138 need to be authenticated. If so, then broker module 136 moves on to the next block 138 to be authenticated, and method 200 returns to step 208 so as to repeat authentication steps 208 through 216 for the next block 138 to be authenticated. If at step 218 broker module 136 determines that no more blocks 138 need to be authenticated, then method 200 proceeds to step 220, at which broker module 136 transmits an AUTHENTIC response to the requesting software module. After step 220, method 200 ends.

After method 200 ends at step 220, the requesting software module, or another software module in communication with the requesting software module, may perform an operation on data contained within authenticated block 138. In an embodiment, broker module 136 may perform an operation on data contained within authenticated block 138. The operation may be a create, retrieve, update, or delete (CRUD) operation.

It should be noted that algorithm 140 present in data structure 128 and/or base VM 142 is upgradeable. The precise method of upgrading depends on the location of algorithm 140, whether the code for algorithm 140 is present in one location or several locations, and/or on the structure of data structure 128. For example, if data structure 128 is a blockchain and algorithm 140 is present entirely within block 138, then algorithm 140 may be upgraded by adding a new block 138 with a new algorithm 140 to data structure 128. If data structure 128 is a blockchain and the code for algorithm 140 is at least partially present outside of data structure 128, such as within base VM code 142, then algorithm 140 may be upgradeable for every block 138 in data structure 128 by updating code of algorithm 140 that is present outside of data structure 128, such as by upgrading the code of base VM 142. Algorithm 140 may also be upgraded by modifying input data used by algorithm 140, such as modifying a seed value or a working set.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of authenticating a first storage block, the method comprising:
   receiving an authentication request specifying the first storage block to be authenticated;
   subsequent to the receiving, instantiating a first virtual computing instance (VCI), code of which is, at least partially, located within the first storage block, the first VCI comprising a first algorithm, wherein the first VCI is instantiated on a host computer;
   executing the first algorithm;
   obtaining, from the first algorithm, an authentication indication of whether the first storage block is authentic or inauthentic; and
   transmitting the authentication indication.

2. The method of claim 1, wherein the code for the first VCI comprises a first part and a second part, the first part comprising the first algorithm and the second part comprising a base VCI code, wherein the base VCI code is stored separately from the first algorithm, and wherein instantiating the first VCI comprises combining the first part and the second part.

3. The method of claim 1, wherein the first algorithm is stored as a first part and a second part, the first part stored on the first storage block and the second part stored separately, wherein instantiating the first VCI comprises combining the first part and the second part.

4. The method of claim 1, further comprising, upon transmitting the authentication indication, performing an operation on data within the first storage block, wherein the operation is at least one of a create, retrieve, update, or delete operation.

5. The method of claim 1, wherein a data structure comprises a plurality of storage blocks, and wherein the plurality of storage blocks comprises the first storage block.

6. The method of claim 5, wherein the data structure comprises a second storage block containing code for instantiating a second VCI comprising a second algorithm, such that the first algorithm is different from the second algorithm.

7. The method of claim 5, wherein the authenticating the first storage block comprises authenticating the data structure by comparing a first hash value stored in the first storage block to a second hash value, wherein the first hash value is an output of a hash function and the second hash value is an output of the hash function.

8. The method of claim 5, wherein the data structure is a blockchain.

9. The method of claim 1, wherein the first algorithm comprises a hash function.

10. The method of claim 1, wherein input to the first algorithm, during the executing of the first algorithm, comprises at least one of data on the host computer, an identifier of the host computer, or data on the first storage block.

11. The method of claim 1, further comprising upgrading the first algorithm by either modifying code of the first algorithm or by modifying input data of the first algorithm.

12. The method of claim 1, wherein the executing the first algorithm is performed on a compute accelerator (CA).

13. A non-transitory computer readable medium comprising instructions to be executed in a processor of a computer system, the instructions when executed in the processor cause the computer system to carry out a method of authenticating a first storage block, w the method comprising:
   receiving an authentication request specifying the first storage block to be authenticated;
   subsequent to the receiving, instantiating a first virtual computing instance (VCI), code of which is, at least partially, located within the first storage block, the first VCI comprising a first algorithm, wherein the first VCI is instantiated on a host computer;
   executing the first algorithm;
   obtaining, from the first algorithm, an authentication indication of whether the first storage block is authentic or inauthentic; and
   transmitting the authentication indication.

14. The non-transitory computer readable medium of claim 13, wherein the code for the first VCI comprises a first part and a second part, the first part comprising the first algorithm and the second part comprising a base VCI code, wherein the base VCI code is stored separately from the first algorithm, and wherein instantiating the first VCI comprises combining the first part and the second part.

15. The non-transitory computer readable medium of claim 13, wherein the first algorithm is stored as a first part and a second part, the first part stored on the first storage block and the second part stored separately, wherein instantiating the first VCI comprises combining the first part and the second part.

16. The non-transitory computer readable medium of claim 13, the method further comprising, upon transmitting the authentication indication, performing an operation on data within the first storage block, wherein the operation is at least one of a create, retrieve, update, or delete operation.

17. The non-transitory computer readable medium of claim 13, wherein a data structure comprises a plurality of storage blocks, and wherein the plurality of storage blocks comprises the first storage block.

18. The non-transitory computer readable medium of claim 17, wherein the data structure comprises a second storage block containing code for instantiating a second VCI comprising a second algorithm, such that the first algorithm is different from the second algorithm.

19. The non-transitory computer readable medium of claim 13, wherein input to the first algorithm, during the executing of the first algorithm, comprises at least one of data on the host computer, an identifier of the host computer, or data on the first storage block.

20. A computer system comprising:
   a host computer;
   a first virtual computing instance (VCI);
   a storage data structure comprising a first storage block; and
   a processor, wherein the processor is programmed to carry out a method of authenticating the first storage block, the method comprising:
   receiving an authentication request specifying the first storage block to be authenticated;
   subsequent to the receiving, instantiating the first VCI, code of which is, at least partially, located within the first storage block, the first VCI comprising a first algorithm, wherein the first VCI is instantiated on the host computer;
   executing the first algorithm;
   obtaining, from the first algorithm, an authentication indication of whether the first storage block is authentic or inauthentic; and
   transmitting the authentication indication.

* * * * *